(12) United States Patent
Meyer et al.

(10) Patent No.: US 11,781,909 B2
(45) Date of Patent: Oct. 10, 2023

(54) SUPPORT STRUCTURE AND METHOD FOR FOCUS ADJUSTMENT

(71) Applicant: THERMO ELECTRON SCIENTIFIC INSTRUMENTS LLC

(72) Inventors: Matthew Meyer, Madison, WI (US); Francis Deck, Madison, WI (US)

(73) Assignee: Thermo Electron Scientific Instruments LLC, Hillsboro, OR (US)

( * ) Notice: Subject to any disclaimer, the term of this patent is extended or adjusted under 35 U.S.C. 154(b) by 0 days.

(21) Appl. No.: 17/684,603

(22) Filed: Mar. 2, 2022

(65) Prior Publication Data
US 2022/0283026 A1 Sep. 8, 2022

Related U.S. Application Data

(60) Provisional application No. 63/156,499, filed on Mar. 4, 2021.

(51) Int. Cl.
*G01J 3/02* (2006.01)
*G01J 3/18* (2006.01)

(52) U.S. Cl.
CPC ............ *G01J 3/0202* (2013.01); *G01J 3/021* (2013.01); *G01J 3/0208* (2013.01); *G01J 3/0237* (2013.01); *G01J 3/18* (2013.01)

(58) Field of Classification Search
CPC ........ G01J 3/0202; G01J 3/0208; G01J 3/021; G01J 3/0237; G01J 3/18; G01J 1/0403; G01J 1/0448; G02B 7/00; G02B 7/003; G02B 7/004; G02B 7/005; G02B 7/02
See application file for complete search history.

(56) References Cited

U.S. PATENT DOCUMENTS

| | | | |
|---|---|---|---|
| 4,918,306 A * | 4/1990 | Saito | G02B 26/10 250/236 |
| 5,184,191 A * | 2/1993 | Krishnan | G01N 21/01 356/244 |
| 5,262,845 A | 11/1993 | Milosevic et al. | |
| 6,266,196 B1 * | 7/2001 | Do | G02B 7/023 359/813 |
| 2003/0142972 A1 * | 7/2003 | Westerweck | G03B 13/08 396/385 |
| 2004/0165238 A1 * | 8/2004 | Morita | G02B 26/122 359/196.1 |

(Continued)

OTHER PUBLICATIONS

PCT/IB2022/051846, International Search Report and Written Opinion, dated May 12, 2022, 9 pages.

*Primary Examiner* — Tarifur R Chowdhury
*Assistant Examiner* — Carlos Perez-Guzman

(57) ABSTRACT

An embodiment of a support structure for adjusting the position of a plurality of optical elements is described that comprises a base plate comprising a centering pin, a first translation slot, and a second translation slot; and a translatable plate configured to operatively couple with a plurality of the optical elements and move relative to the base plate, wherein the translatable plate comprises a centering slot configured to engage with the centering pin, a first cam configured to engage with the first translation slot and control movement of the translatable plate along a first axis, and a second cam configured to engage with the second translation slot and control movement of the translatable plate along a second axis.

32 Claims, 7 Drawing Sheets

(56) References Cited

U.S. PATENT DOCUMENTS

| | | | |
|---|---|---|---|
| 2005/0237636 A1* | 10/2005 | Bedzyk | G02B 7/023 359/819 |
| 2015/0143940 A1* | 5/2015 | Choi | G02B 21/26 74/480 R |
| 2015/0309438 A1 | 10/2015 | Kodo et al. | |

* cited by examiner

SUPPORT STRUCTURE AND METHOD FOR FOCUS ADJUSTMENT

CROSS-REFERENCE TO RELATED APPLICATIONS

The present application claims the priority benefit from U.S. Patent Application Ser. No. 63/156,499, filed Mar. 4, 2021, which is hereby incorporated by reference herein in its entirety for all purposes.

FIELD OF THE INVENTION

The present invention is generally directed to a support structure with a translation assembly configured to easily achieve a substantially optimal focus and alignment of a light beam to a spectrometer detector.

BACKGROUND

It is generally appreciated that a challenge with many embodiments of spectrometer includes the ability to easily and accurately adjust the focus of and alignment of a light beam onto a detector. The task is especially difficult for those making adjustments in the field, where the engineer doesn't have access to specialized resources. For example, in many spectrometer embodiments the detector is mounted in a fixed position on a base plate within the spectrometer using fasteners configured to hold the detector in place as a permanent assembly to preserve the focus position. In these embodiments if it is desired to adjust the focus, an engineer at least partially dismantles the assembly by releasing the fasteners enough to move the position of the detector on the plate. In the present example, the position of the detector may be adjusted over one or more degrees of freedom (e.g. forward to back and left to right) while the signal from the detector monitored (e.g. for a Raman spectrometer a neon spectrum may be monitored to achieve the best full width half maximum).

There are a number of disadvantages of this approach that include the need to return the spectrometer to the factory for adjustment if an issue with the detector is identified in the field that requires replacement. This is due to the fact that a service engineer is not capable of quickly or efficiently refocusing a new detector outside of the factory environment.

Therefore, a need exists for a configuration to allows for easy and accurate adjustment of focus and alignment without the use of specialized tools or resources.

SUMMARY

Systems, methods, and products to address these and other needs are described herein with respect to illustrative, non-limiting, implementations. Various alternatives, modifications and equivalents are possible.

An embodiment of a support structure for adjusting the position of a plurality of optical elements is described that comprises a base plate comprising a centering pin, a first translation slot, and a second translation slot; and a translatable plate configured to operatively couple with a plurality of the optical elements and move relative to the base plate, wherein the translatable plate comprises a centering slot configured to engage with the centering pin, a first cam configured to engage with the first translation slot and control movement of the translatable plate along a first axis, and a second cam configured to engage with the second translation slot and control movement of the translatable plate along a second axis.

In some cases, the optical elements include optical mirrors, and the movement of the translatable plate along the first axis may be configured to enable alignment of a spectrograph. The movement of the translatable plate along the second axis may also comprise linear movement of the centering pin in the centering slot where the first axis may be substantially parallel to the centering slot, and/or may be substantially parallel to the second translation slot, and/or may be substantially perpendicular to the first translation slot.

In some implementations, the movement of the translatable plate along the second axis is configured to focus a light beam across a length of an array detector, and may comprise rotation around the centering pin.

Further, the first cam and the second cam may each comprise a cam pin that, in some instances may be offset from a center of a body of the first cam and the second cam. Rotation of the first cam around the cam pin may cause a force between the first cam and a first opening in the translatable plate to move the translatable plate relative to the base plate along the first axis. In some applications, about $\frac{1}{10}$ of a full rotation provides an entire range of travel that can be about 2.25 mm.

An embodiment of a system for adjusting characteristics of a light beam is described that comprises an aperture through which a light beam enters; a detector configured to produce a signal in response to the light beam; and a support structure comprising: a base plate comprising a centering pin, a first translation slot, and a second translation slot; and a translatable plate operatively coupled with a plurality of the optical elements configured to direct the light beam from the aperture to the detector and move relative to the base plate, wherein the translatable plate comprises a centering slot configured to engage with the centering pin, a first cam configured to engage with the first translation slot and control movement of the translatable plate along a first axis, and a second cam configured to engage with the second translation slot and control movement of the translatable plate along a second axis.

In some cases, the optical elements include optical mirrors, and the movement of the translatable plate along the first axis may be configured to align a spectrograph. The movement of the translatable plate along the second axis may also comprise linear movement of the centering pin in the centering slot where the first axis may be substantially parallel to the centering slot, and/or may be substantially parallel to the second translation slot, and/or may be substantially perpendicular to the first translation slot.

In some implementations, the movement of the translatable plate along the second axis is configured to focus a light beam across a length of an array detector, and may comprise rotation around the centering pin.

Further, the first cam and the second cam may each comprise a cam pin that, in some instances may be offset from a center of a body of the first cam and the second cam. Rotation of the first cam around the cam pin may cause a force between the first cam and a first opening in the translatable plate to move the translatable plate relative to the base plate along the first axis. In some applications, about $\frac{1}{10}$ of a full rotation provides an entire range of travel that can be about 2.25 mm.

A method for adjusting characteristics of a light beam is described that comprises moving a translatable plate relative to a base plate, wherein the translatable plate is operatively coupled with a plurality of the optical elements configured to direct a light beam from an aperture to a detector, and wherein the base plate comprises a centering pin, a first translation slot, and a second translation slot; and the translatable plate comprises a centering slot configured to engage with the centering pin, a first cam configured to engage with the first translation slot and control movement of the translatable plate along a first axis, and a second cam configured to engage with the second translation slot and control movement of the translatable plate along a second axis.

In some instances, moving the translatable plate along the first axis enables alignment of a spectrograph. Also, in some instances moving the translatable plate along the second axis enables focusing the light beam across a length of an array detector.

Further, rotating the first cam around a cam pin may cause a force between the first cam and a first opening in the translatable plate to move the translatable plate relative to the base plate along the first axis The above embodiments and implementations are not necessarily inclusive or exclusive of each other and may be combined in any manner that is non-conflicting and otherwise possible, whether they are presented in association with a same, or a different, embodiment or implementation. The description of one embodiment or implementation is not intended to be limiting with respect to other embodiments and/or implementations. Also, any one or more function, step, operation, or technique described elsewhere in this specification may, in alternative implementations, be combined with any one or more function, step, operation, or technique described in the summary Thus, the above embodiment and implementations are illustrative rather than limiting.

BRIEF DESCRIPTION OF THE DRAWINGS

The above and further features will be more clearly appreciated from the following detailed description when taken in conjunction with the accompanying drawings. In the drawings, like reference numerals indicate like structures, elements, or method steps and the leftmost digit of a reference numeral indicates the number of the figure in which the references element first appears (for example, element 110 appears first in FIG. 1). All of these conventions, however, are intended to be typical or illustrative, rather than limiting.

Like reference numerals refer to corresponding parts throughout the several views of the drawings.

DETAILED DESCRIPTION OF EMBODIMENTS

As will be described in greater detail below, embodiments of the described invention include a support structure with a translation assembly configured to easily achieve a substantially optimal focus and alignment of a light beam to a spectrometer detector. More specifically, the translation assembly includes cam elements that enable fine adjustment of the position of the translatable plate in 2 degrees of freedom.

Figure 1:
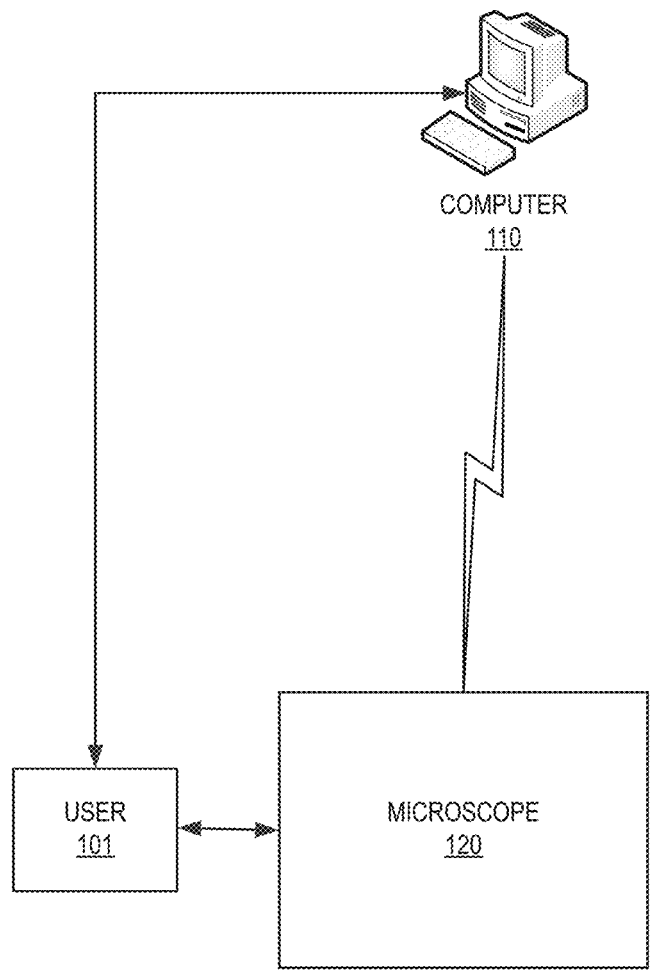
FIG. 1 is a functional block diagram of one embodiment of a microscope instrument in communication with a computer.

FIG. 1 provides a simplified illustrative example of user 101 capable of interacting with computer 110 and microscope 120. Embodiments of microscope 120 may include a variety of commercially available microscopes. For example, microscope 120 may include the DXR confocal enabled Raman microscopes available from Thermo Fisher Scientific. FIG. 1 also illustrates a network connection between computer 110 and microscope 120, however it will be appreciated that FIG. 1 is intended to be exemplary and additional or fewer network connections may be included. Further, the network connection between the elements may include "direct" wired or wireless data transmission (e.g. as represented by the lightning bolt) as well as "indirect" communication via other devices (e.g. switches, routers, controllers, computers, etc.) and therefore the example of FIG. 1 should not be considered as limiting.

Computer 110 may include any type of computing platform such as a workstation, a personal computer, a tablet, a "smart phone", one or more servers, compute cluster (local or remote), or any other present or future computer or cluster of computers. Computers typically include known components such as one or more processors, an operating system, system memory, memory storage devices, input-output controllers, input-output devices, and display devices. It will also be appreciated that more than one implementation of computer 110 may be used to carry out various operations in different embodiments, and thus the representation of computer 110 in FIG. 1 should not be considered as limiting.

In some embodiments, computer 110 may employ a computer program product comprising a computer usable medium having control logic (e.g. computer software program, including program code) stored therein. The control logic, when executed by a processor, causes the processor to perform some or all of the functions described herein. In other embodiments, some functions are implemented primarily in hardware using, for example, a hardware state machine. Implementation of the hardware state machine so as to perform the functions described herein will be apparent to those skilled in the relevant arts. Also in the same or other embodiments, computer 110 may employ an internet client that may include specialized software applications enabled to access remote information via a network. A network may include one or more of the many types of networks well known to those of ordinary skill in the art. For example, a network may include a local or wide area network that may employ what is commonly referred to as a TCP/IP protocol suite to communicate. A network may include a worldwide system of interconnected computer networks that is commonly referred to as the internet, or could also include various intranet architectures. Those of ordinary skill in the related art will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

As described herein, embodiments of the described invention include a support structure configured with a base plate and a translation plate that moves relative to the base plate, where the translation plate includes optical components that direct a light beam to a spectrometer detector.

Figure 2:
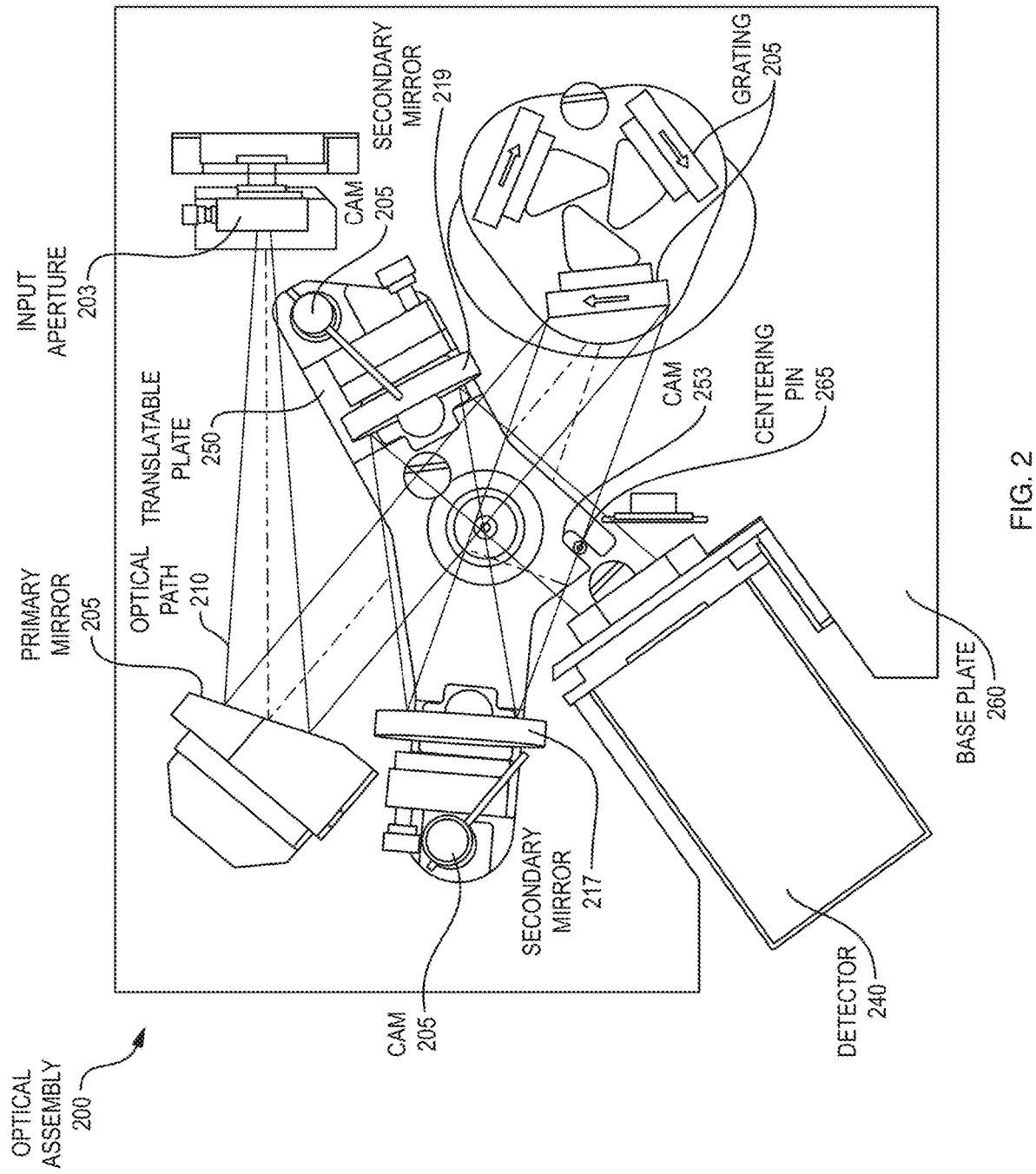
FIG. 2 is a simplified graphical representation of one embodiment of an optical assembly comprising a base plate and a translatable plate.

FIG. 2 provides a simplified illustrative example of optical assembly 200 that includes a plurality of optical elements in a "triple spectrograph" arrangement as described in U.S. Pat. No. 7,345,760, which is hereby incorporated by reference herein in its entirety for all purposes. For example, optical assembly 200 includes input aperture 203 that introduces a light beam onto optical path 210 to primary mirror 205. The light beam reflects off primary mirror 205 and travels to grating 235 that conditions the light beam and reflects along optical path 210 to secondary mirror 217, the position of which relative to optical path 210 affects the focus of the light beam across an array of elements of detector 240 (e.g. the characteristics of grating 235 may be selectable by rotating a desired embodiment into optical path 210). The light beam then reflects from secondary mirror 217, is directed along optical path 210 to secondary mirror 219, the position of which, relative to optical path 210, affects the focus of the light beam onto detector 240.

FIG. 2 also illustrates base plate 260 with centering pin 265 and translatable plate 250 with slot 253 that engages with centering pin 265 where centering pin 265 is allowed to move along the axis of slot 253. Translatable plate 250 also includes two embodiments of cam 205 that can be used to move translatable plate 250 in a very precise manner relative to base plate 260.

Figure 3:
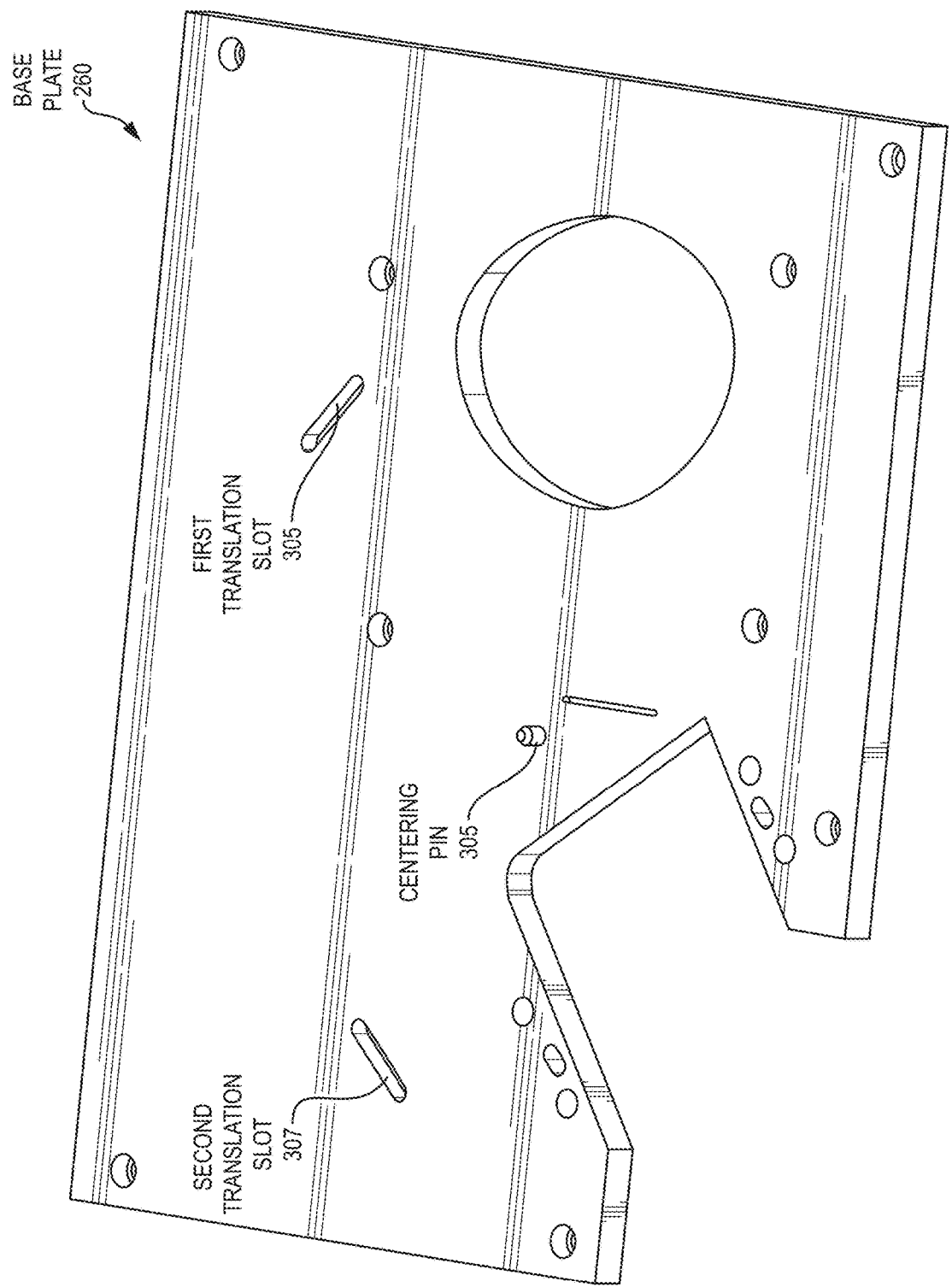
FIG. 3 is a simplified graphical representation of one embodiment of the base plate of FIG. 2 that comprises a centering pin, a first translation slot, and a second translation slot.

FIG. 3 provides a simplified illustrative example of base plate 260 that more clearly shows centering pin 265 as well as first translation slot 305 and second translation slot 307. As will be described in further detail below, first translation slot 305 and second translation slot 307 are used to control the position of translatable plate 250 relative to base plate 260.

Figure 4:
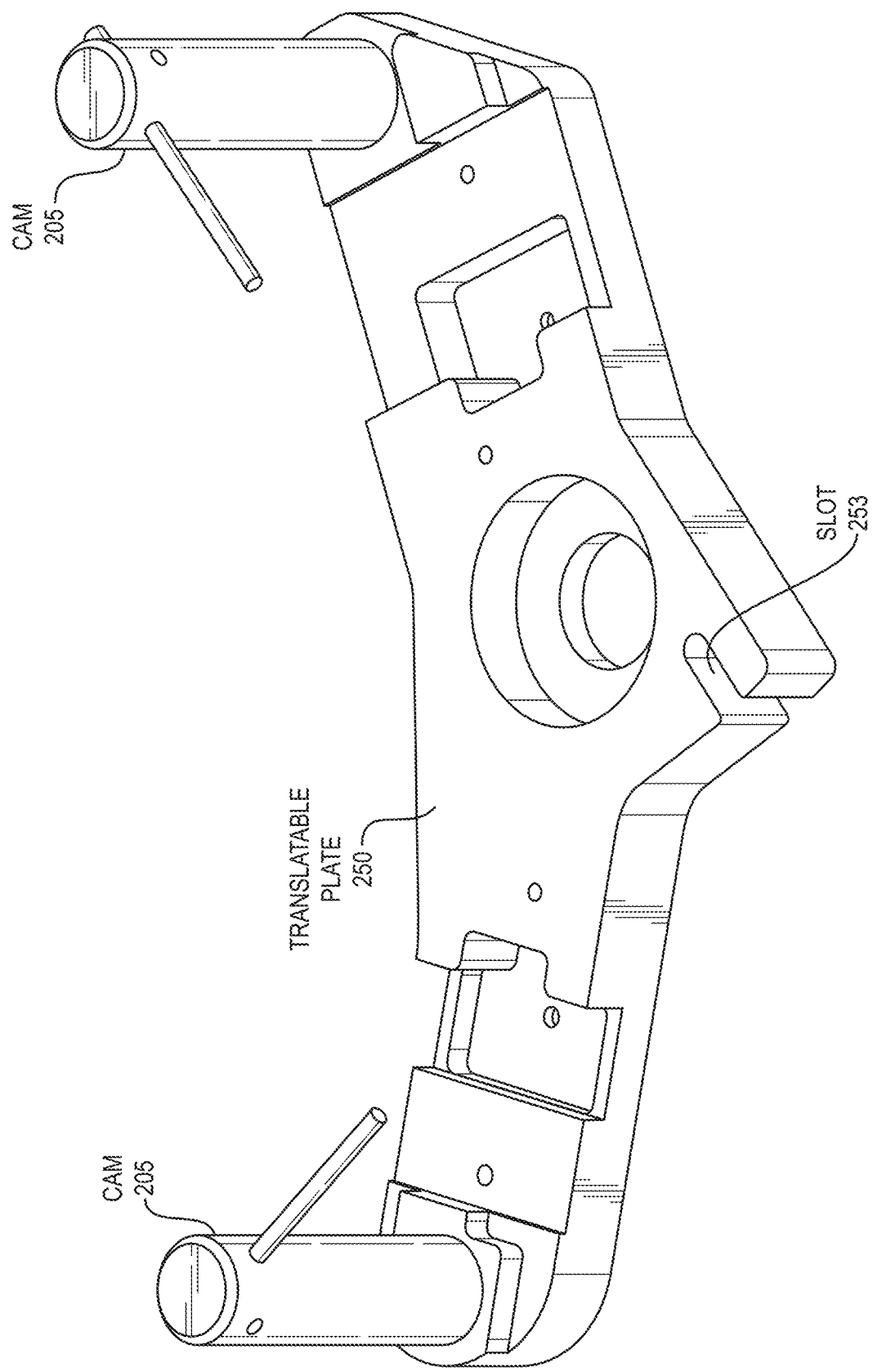
FIG. 4 is a simplified graphical representation of one embodiment of the translatable plate of FIG. 2 that comprises a slot, and two cam elements.
Figure 5:
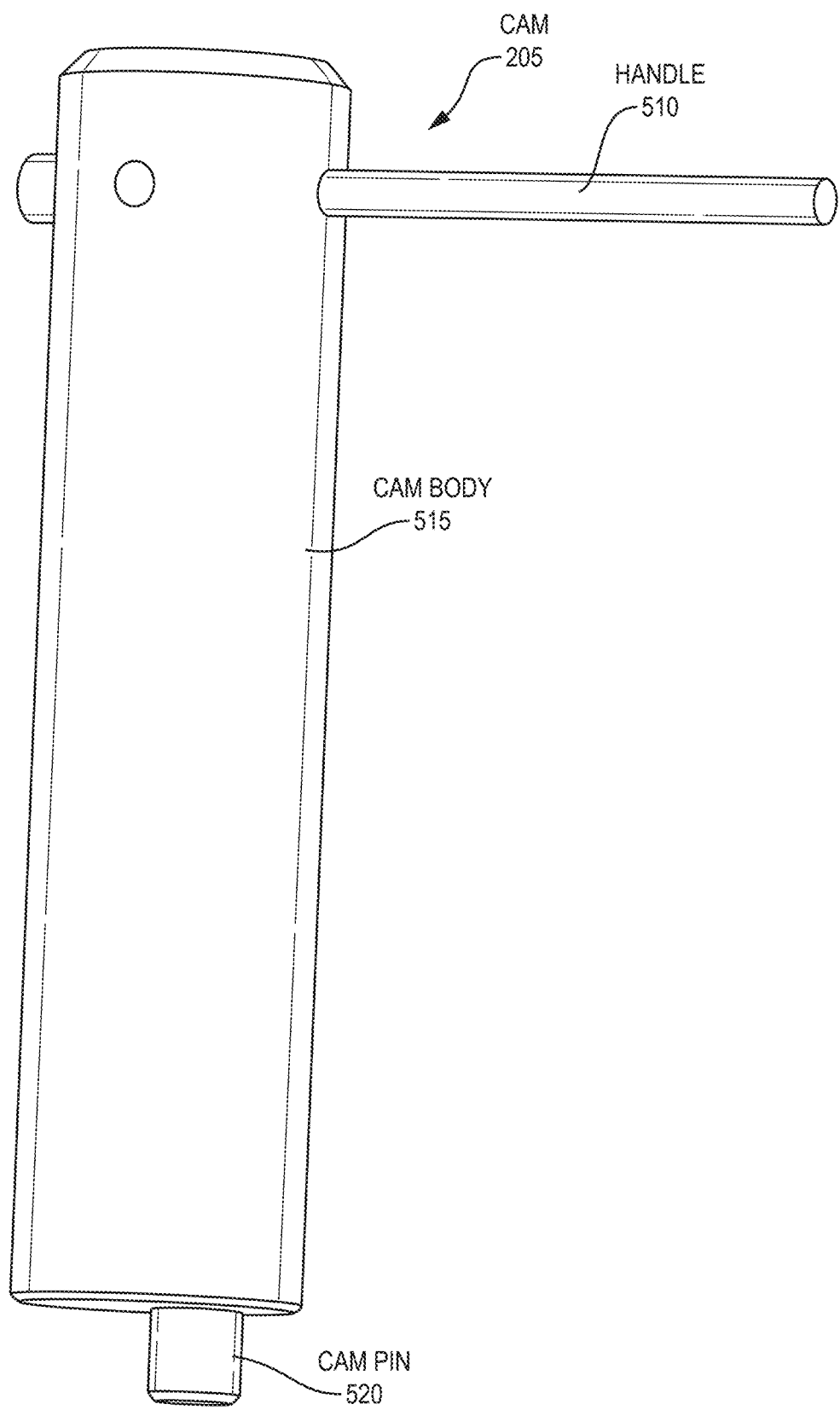
FIG. 5 is a simplified graphical representation of one embodiment of one of the cam elements of FIG. 4 that comprises a cam pin.

FIG. 4 provides a simplified illustrative example of translatable plate 250 with slot 253 and two implementations of cam 205. FIG. 5 provides a simplified illustrative example of cam 205 with handle 510 attached to cam body 515, where handle 510 provides user 101 with leverage to provide a rotational force to cam 205. FIG. 5 also illustrates cam pin 520 attached to the base of cam body 515. For example, the base of cam body 515 may be substantially circular (e.g. when viewed from below) with cam pin 520 located in a position that is offset from the center of the circle.

Figure 6:
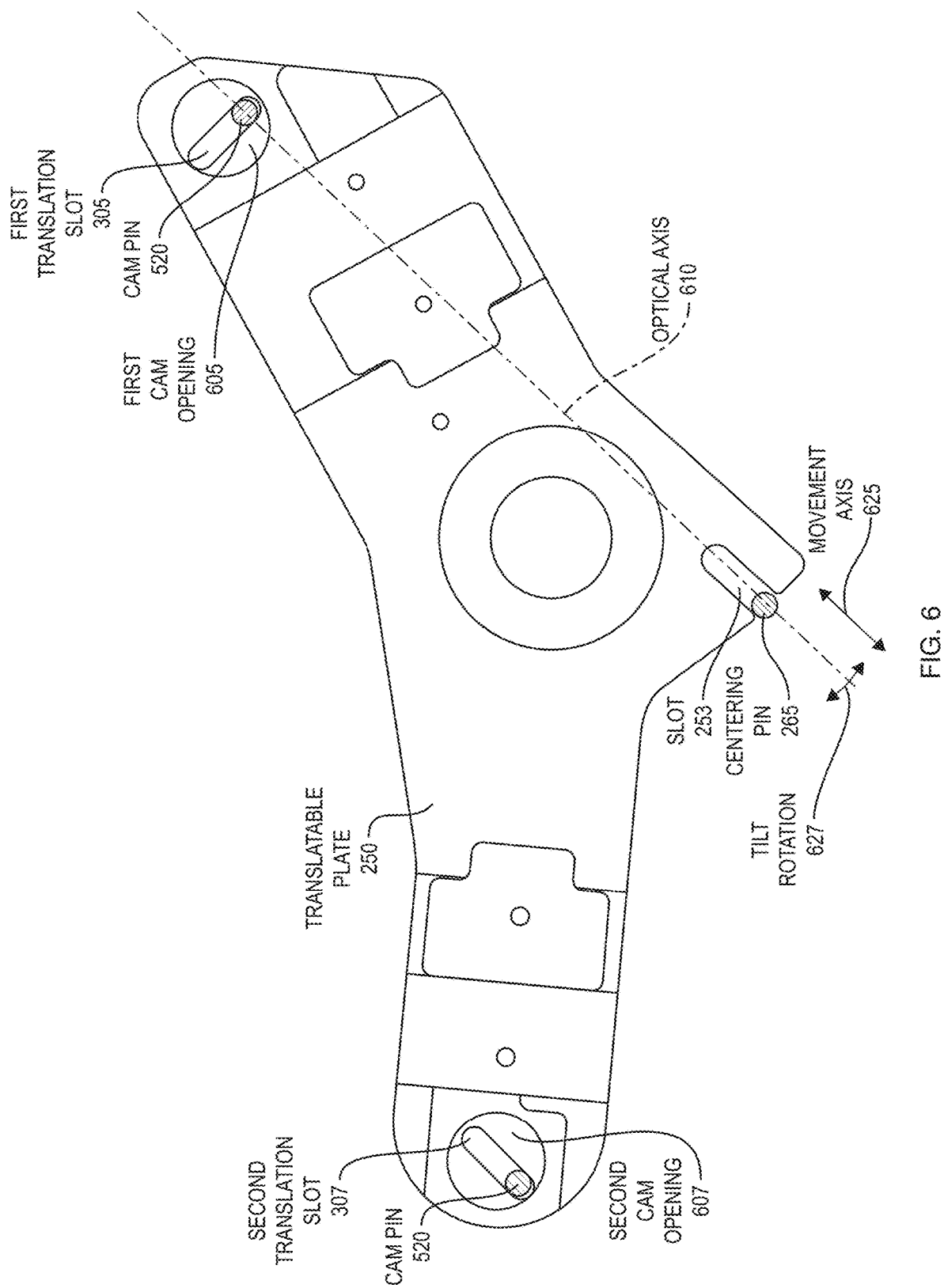
FIG. 6 is a simplified graphical representation of one embodiment of the translatable plate of FIGS. 2 and 4 that comprises a first cam opening and a second cam opening through which the cam pin of each cam engages with one of the translation slots of FIG. 3.

FIG. 6 provides a simplified illustrative example of translatable plate 250 with centering pin 265 located in the base plate 260, as close to the focal plane of detector 240, and to optical axis 610, as practicable. Slot 253 in base plate 260 is substantially parallel to optical axis 610, and sliding translatable plate 250 along the direction of movement axis 625 (e.g. along slot 253) results in a substantially "focusing" motion, which is the primary motion required to align detector 240. Using slot 253 and centering pin 265 allows this "focusing" motion while permitting a second degree of freedom, a rotation around centering pin 265 along tilt rotation 627. Tilt rotation 627 allows for optimizing the quality of focus across the length of the array detector, rather than just at one point.

FIG. 6 further illustrates an embodiment of cam pin 520 engaged with first translation slot 305 and an embodiment of cam pin 520 engaged with second cam slot 307. For example, an embodiment of cam 205 is inserted through first cam opening 605 in translatable plate 250 so that cam pin 520 engages with first translation slot 305 in base plate 260. Similarly, an embodiment of cam 205 is inserted through second cam opening 607 in translatable plate 250 so that cam pin 520 engages with second translation slot 307 in base plate 260. Because cam pin 520 is offset from a center position in cam body 515, rotation of cam 205 in first translation slot 305 and/or second translation slot 307 causes a force between cam body 515 and the wall of first cam opening 605 and/or second cam opening 607 that results in movement of translatable plate 250 relative to base plate 260.

Figure 7:
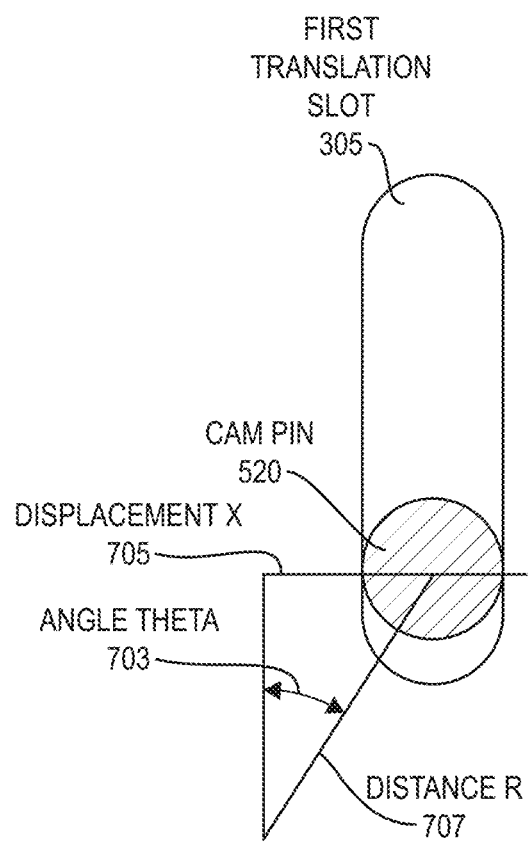
FIG. 7 is a simplified graphical representation of one embodiment of the first translation slot engaged with a cam pin.

FIG. 7 provides a simplified illustrative example of how displacement of angle theta 703 results in a displacement X 705 by the formula:

$$X = R \sin(\text{Theta})$$

Where distance R 707 is the distance from the center of the pin to the center axis of cam 205. For example, the actual value of distance R 707 provides the function of determining the leverage or mechanical advantage of cam 205. It may be desirable that distance R 707 is chosen so that a rotation of roughly ±1/10 of a full circle provides the entire amount of travel needed for adjustment. In the presently described example, optical tolerances could produce a variation of roughly 1% of the focal length of detector 240, preferably around 225 mm, thus requiring a travel of about 2.25 mm, so distance R 707 should be about 3.8 mm.

For example, returning to FIG. 6 cam 205 positioned in first cam opening 605 may be located substantially along optical axis 610 (e.g. optical axis 610 is substantially parallel to slot 253), where cam pin 520 engages with first translation slot 305 that is substantially perpendicular to optical axis 610. Thus, rotating the cam at first cam opening 605 will push the plate back and forth along optical axis, 610 resulting in a "focus" adjustment. Because first translation slot 305 is substantially perpendicular to optical axis 610, translatable plate 250 is free to rotate around centering pin 265 (e.g. tilt rotation 627), along the length of first translation slot 305.

Continuing with the present example, a second implementation of cam 205 205 positioned in second cam opening 607 performs the "tilt" adjustment. Second translation slot 307 may be substantially parallel to optical axis 610, thus it does not constrain the "focus" adjustment. However, rotating cam 205 in second cam opening 607 will drive translatable plate 250 to an orientation that constrains its "tilt" axis while still allowing for further "focus" adjustment.

Having described various embodiments and implementations, it should be apparent to those skilled in the relevant art that the foregoing is illustrative only and not limiting, having been presented by way of example only. Many other schemes for distributing functions among the various functional elements of the illustrated embodiments are possible. The functions of any element may be carried out in various ways in alternative embodiments

What is claimed is:

1. A support structure for adjusting the position of a plurality of optical elements, comprising:

a base plate comprising a centering pin, a first translation slot, and a second translation slot; and
a translatable plate configured to operatively couple with a plurality of the optical elements and move relative to the base plate, wherein the translatable plate comprises a centering slot configured to engage with the centering pin, a first cam configured to engage with the first translation slot and control movement of the translatable plate along a first axis, and a second cam configured to engage with the second translation slot and control movement of the translatable plate along a second axis.

2. The support structure of claim 1, wherein:
the optical elements comprise mirrors.

3. The support structure of claim 1, wherein:
the movement of the translatable plate along the first axis is configured to enable alignment of a spectrograph.

4. The support structure of claim 3, wherein:
the movement of the translatable plate along the second axis comprise linear movement of the centering pin in the centering slot.

5. The support structure of claim 3, wherein:
the first axis is substantially parallel to the centering slot.

6. The support structure of claim 3, wherein:
the first axis is substantially parallel to the second translation slot.

7. The support structure of claim 3, wherein:
the first axis is substantially perpendicular to the first translation slot.

8. The support structure of claim 1, wherein:
the movement of the translatable plate along the second axis is configured to focus a light beam across a length of an array detector.

9. The support structure of claim 8, wherein:
the movement of the translatable plate along the second axis comprise rotation around the centering pin.

10. The support structure of claim 1, wherein:
the first cam and the second cam each comprise a cam pin.

11. The support structure of claim 10, wherein:
the cam pin is offset from a center of a body of the first cam and the second cam.

12. The support structure of claim 11, wherein:
rotation of the first cam around the cam pin causes a force between the first cam and a first opening in the translatable plate to move the translatable plate relative to the base plate along the first axis.

13. The support structure of claim 12, wherein:
about 1/10 of a full rotation provides an entire range of travel.

14. The support structure of claim 13, wherein:
the range of travel is about 2.25 mm.

15. A system for adjusting characteristics of a light beam, comprising:
an aperture through which a light beam enters;
a detector configured to produce a signal in response to the light beam; and
a support structure comprising:
a base plate comprising a centering pin, a first translation slot, and a second translation slot; and
a translatable plate operatively coupled with a plurality of the optical elements configured to direct the light beam from the aperture to the detector and move relative to the base plate, wherein the translatable plate comprises a centering slot configured to engage with the centering pin, a first cam configured to engage with the first translation slot and control movement of the translatable plate along a first axis, and a second cam configured to engage with the second translation slot and control movement of the translatable plate along a second axis.

16. The system structure of claim 15, wherein:
the optical elements comprise mirrors.

17. The system of claim 15, wherein:
the movement of the translatable plate along the first axis is configured to align a spectrograph.

18. The system of claim 17, wherein:
the movement of the translatable plate along the second axis comprise linear movement of the centering pin in the centering slot.

19. The system of claim 17, wherein:
the first axis is substantially parallel to the centering slot.

20. The system of claim 17, wherein:
the first axis is substantially parallel to the second translation slot.

21. The system of claim 17, wherein:
the first axis is substantially perpendicular to the first translation slot.

22. The system of claim 15, wherein:
the movement of the translatable plate along the second axis is configured to focus a light beam across a length of an array detector.

23. The system of claim 22, wherein:
the movement of the translatable plate along the second axis comprise rotation around the centering pin.

24. The system of claim 15, wherein:
the first cam and the second cam each comprise a cam pin.

25. The system of claim 24, wherein:
the cam pin is offset from a center of a body of the first cam and the second cam.

26. The system of claim 25, wherein:
rotation of the first cam around the cam pin causes a force between the first cam and a first opening in the translatable plate to move the translatable plate relative to the base plate along the first axis.

27. The system of claim 26, wherein:
about 1/10 of a full rotation provides an entire range of travel.

28. The system of claim 27, wherein:
the range of travel is about 2.25 mm.

29. A method for adjusting characteristics of a light beam, comprising:
moving a translatable plate relative to a base plate,
wherein the translatable plate is operatively coupled with a plurality of the optical elements configured to direct a light beam from an aperture to a detector, and
wherein the base plate comprises a centering pin, a first translation slot, and a second translation slot; and the translatable plate comprises a centering slot configured to engage with the centering pin, a first cam configured to engage with the first translation slot and control movement of the translatable plate along a first axis, and a second cam configured to engage with the second translation slot and control movement of the translatable plate along a second axis.

30. The method of claim 29, wherein:
moving the translatable plate along the first axis enables alignment of a spectrograph.

31. The method of claim 29, wherein:
moving the translatable plate along the second axis enables focusing the light beam across a length of an array detector.

32. The system of claim 29, wherein:
rotating the first cam around a cam pin causes a force between the first cam and a first opening in the translatable plate thereby moving the translatable plate relative to the base plate along the first axis.

* * * * *